(No Model.)
H. SEMPLE.
VELOCIPEDE.
No. 447,741. Patented Mar. 3, 1891.
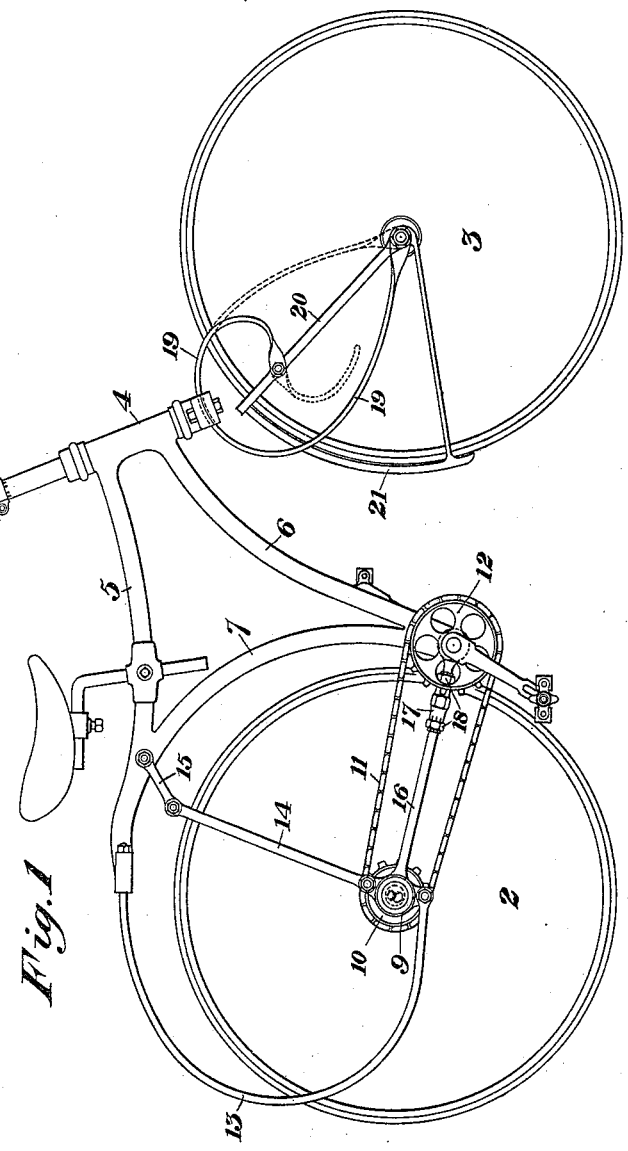
WITNESSES
Thomas W. Bakewell
H. L. Gill
INVENTOR
Harry Semple

UNITED STATES PATENT OFFICE

HARRY SEMPLE, OF STEUBENVILLE, OHIO, ASSIGNOR OF ONE-HALF TO JOHN F. FLOOD, OF SAME PLACE.

VELOCIPEDE.

SPECIFICATION forming part of Letters Patent No. 447,741, dated March 3, 1891.

Application filed July 5, 1890. Serial No. 357,757. (No model.)

*To all whom it may concern:*

Be it known that I, HARRY SEMPLE, of Steubenville, in the county of Jefferson and State of Ohio, have invented a new and useful Improvement in Velocipedes or Bicycles, of which the following is a full, clear, and exact description.

The object of my invention is to improve the construction of bicycles or velocipedes, to increase their strength, and by providing them with efficient springs to render them easier and more comfortable in their motion. The problem of providing bicycles with springs has always presented practical difficulties, and many attempts, more or less successful, have been made to overcome them.

My invention consists, broadly, in providing a bicycle with a rearwardly-bowed spring or springs extending to the rear-wheel bearing from the bicycle-frame; also, in connecting the rear-wheel bearing with the frame by means of jointed braces adapted to brace the bicycle laterally and to prevent side lash or motion thereof, in combination with such spring or springs; also, in constructing a bicycle-frame of substantial triangular form having a portion extending from the steering-head to the pedal-crank bearing and a portion extending from the latter to the upper portion of the frame; also, in providing for the front wheel a bowed spring or springs whose ends are connected with the front-wheel bearing, while the intermediate portion is connected with the frame.

It also consists in certain details of construction hereinafter described, and particularly designated in the claims.

I shall now describe my invention so that others skilled in the art may make and use the same, reference being had to the accompanying drawings, forming part of this specification, in which—

Figure 1 is a side elevation of my improved bicycle. Fig. 2 is a partial front elevation thereof. Fig. 3 is a plan view showing the rear portion of the top of the frame. Fig. 4 is a sectional detail view.

In the drawings, 2 and 3 are the rear and front wheels of the bicycle.

4 is the steering-head, which forms part of a rigid frame, one branch 5 of which extends rearwardly and supports the saddle-post, and another branch 6 of which extends from the steering-head and joins at its lower end at the bearing of the pedal-crank with the third branch 7, which extends downwardly from the branch 5.

8 is the rear axle, which is preferably fixed, and the rear wheel has fixed to it the usual sprocket-wheel 10, which is connected by a chain 11 with a sprocket-wheel 12 on the pedal-crank shaft.

13 13 are bowed springs, which may be of any suitable cross-section and are arranged at the sides of the wheel. At their lower ends they are pivotally connected to the bearing-box 9, and at their upper ends are secured to the rear end of the part 5 of the frame. The spring thus extends directly over the rear-wheel bearing, or substantially so, so that the compression of the spring is effected without great strain to itself or to the bicycle-frame.

14 14 are braces, which are pivotally secured at their lower ends to lugs on the bearing-box 9, and at their upper ends are united and are pivotally connected by a toggle-joint 15 to the bicycle-frame.

16 16 are brace-rods, which extend from the rear-wheel bearing to the bearing of the pedal-crank shaft. They are preferably made integral with the collars 9 and are adjustable, each being divided and its ends connected by a right and left threaded sleeve-nut 17, by which the distance between the rear axle and the pedal-crank shaft may be varied for the purpose of tightening or slackening the sprocket-chain. To lock the sleeve-nut in its adjustment, I form it with externally-threaded split ends and fit on them threaded locking-nuts 18. In the use of the bicycle, as the spring yields in passing over rough places on the road, the brace maintains the rear-wheel axle and the pedal-crank shaft at a constant distance apart, and thus keeps the sprocket-chain in operative condition.

19 19 are bowed springs, which are fixed rigidly at their lower ends to the front axle and extend upwardly through slots in the lower portion of the steering-head 4, and are then connected again with the front axle. The latter connection is preferably made by braces 20, which extend from the springs to the axle and are connected at their upper ends, being preferably made of a single U-shaped piece. This construction is particularly intended to add lateral rigidity to the wheel. For the purpose of convenience in construction I prefer to use the braces 20 as the means by which the front-wheel mud-guard 21 is upheld.

The use of the spring connections between the wheel-bearings and the bicycle-frame makes the bicycle very easy in its motion, and by reason of the construction which I have described the strength and durability of the frame is not impaired by their use. The use of the braces 14 and 20 is of advantage in attaining the result last mentioned, since they impart great strength to the bicycle-frame by affording resistance to the lateral yielding of the same, and by causing the branches of the springs on opposite sides of the wheels to act in unison.

In Fig. 4 I show in section the construction and arrangement of the pedal-crank shaft. 22 is the crank-shaft, which is encircled by a sleeve or socket 23, in which it is rotatory. 24 is a sleeve encircling the sleeve 23 and formed integrally with the bicycle-frame 6 7. The ends of the sleeve 23 are exteriorly screw-threaded, and the braces 16 are screwed tightly thereon and abut against the ends of the sleeve 24, so that as the rear spring yields the sleeve 23 may turn within the outer sleeve 24, and may thus give the necessary play to the braces. The ends of the sleeve 23 are interiorly grooved to form bearings for balls 25, fitting in a groove on the crank-shaft, and held in place by a grooved cap 26. The balls form the bearing against which the crank-shaft bears in its rotation. The sprocket-wheel 12 is keyed to the crank-shaft in the manner illustrated.

The advantages of my invention will be appreciated by those skilled in the art. It will be apparent to the skilled mechanic familiar with many different forms of bicycles which have been devised and used that the form, relative arrangement, and construction of the parts are susceptible of modification in various ways. For example, the manner of connection of the springs with the wheel-bearings may be modified, and the wheel-bearings themselves and the arrangement of the axles and wheels may be altered.

In Fig. 1 I show by dotted lines a modified arrangement of the front springs, in which the springs, instead of being connected indirectly with the wheel-bearing by the braces 20, are connected at both ends directly with the wheel-bearing. I do not regard this, however, as being so desirable as the construction first described.

With reference to both described forms of the front-wheel springs a distinguishing characteristic of my invention is that by using a bowed spring having connection at both ends with the wheel-bearing and an intermediate connection with the frame a double spring action is secured with consequent strength and durability of the parts.

I claim—

1. In a bicycle or velocipede, the combination, with the frame and the rear-wheel bearing, of a rearwardly-curved C-spring connected by one end to the frame substantially over the bearing and by the other end to the bearing below the center, substantially as and for the purposes described.

2. In a bicycle or velocipede, the combination, with the frame and the rear-wheel bearing, of a rearwardly-curved C-spring connected by one end to the frame and by the other end to the bearing, and a horizontal pivoted brace-rod which connects the bearing with the frame, substantially as and for the purposes described.

3. In a bicycle or velocipede, the combination, with the frame and rear-wheel bearing, of a rearwardly-curved C-spring connected by its upper end with the frame and by its lower end with the bearing, and a vertical toggle or jointed brace-rod which connects the frame and the bearing, the connection of the said jointed brace-rod and spring being at substantially opposite points on the bearing, substantially as and for the purposes described.

4. In a bicycle or velocipede, the combination, with the frame and the rear-wheel bearing, of a rearwardly-curved C-spring connected by its upper end with the frame and by its lower end with the bearing, a horizontal pivoted brace-rod which connects the bearing and the frame, and a vertical toggle or jointed brace-rod which connects the frame and the bearing, the connection of the said jointed brace-rod and the spring being at substantially opposite points on the bearing, substantially as and for the purposes described.

5. In a bicycle or velocipede, the combination, with the pedal-crank bearing, of a substantially triangular frame having rigid parts 6 and 7 extending upwardly from the crank-bearing to the front and rear, respectively, and an integral horizontal brace 5 at the top of the frame, substantially as and for the purposes described.

6. In a bicycle or velocipede, the combination, with the frame and the front-wheel bearing, of a bowed spring whose ends are connected with the bearing and which at a point intermediate of its length is connected with the frame, substantially as and for the purposes described.

7. In a bicycle or velocipede, the combination, with the frame and the front-wheel bearing, of bowed springs at the sides of the front wheel, each connected at one end with the said bearing and with the frame at an intermediate point and at the other end or another intermediate point with braces connecting the springs with said bearing, said braces being connected, substantially as and for the purposes described.

8. In a bicycle or velocipede, the combination of the frame, the driving-wheel bearing, a spring connecting these parts, the crank-shaft bearing, a brace connecting the wheel-bearing with the latter, and a jointed brace connecting the wheel-bearing with the upper part of the frame, substantially as and for the purposes described.

9. The combination, with the pedal-crank shaft, of a sleeve encircling the same and rotary within a socket on the bicycle-frame, braces screwed to the sleeve, and ball-bearings at the ends of the sleeve, substantially as and for the purposes described.

In testimony whereof I have hereunto set my hand this 7th day of June, A. D. 1890.

HARRY SEMPLE.

Witnesses:
W. B. CORWIN,
T. W. BAKEWELL.